United States Patent [19]
Kitano et al.

[11] 3,948,366
[45] Apr. 6, 1976

[54] INCHING AND PRESSURE REGULATING VALVES FOR CLUTCHES

[75] Inventors: Shin Kitano, Aichi; Yutaka Momose, Toyota, both of Japan

[73] Assignee: Aisin Seiki Co., Ltd., Japan

[22] Filed: Feb. 15, 1974

[21] Appl. No.: 443,096

Related U.S. Application Data
[63] Continuation-in-part of Ser. No. 335,144, Feb. 23, 1973.

[30] Foreign Application Priority Data
Mar. 8, 1972  Japan.............................. 47-23781

[52] U.S. Cl. ........... 192/4 A; 192/13 R; 192/109 F; 137/596.2
[51] Int. Cl.² .................. F16D 67/04; F16D 25/10
[58] Field of Search ....... 192/13 R, 4 A, 4 C, 109 F

[56]               References Cited
              UNITED STATES PATENTS

| | | | |
|---|---|---|---|
| 2,814,371 | 11/1957 | Bolster............................. | 192/13 R |
| 3,181,385 | 5/1965 | Siler................................. | 192/4 A X |
| 3,631,948 | 1/1972 | Ishikawa........................... | 192/109 F |
| 3,757,915 | 9/1973 | Momose........................... | 192/109 F |
| 3,850,273 | 11/1974 | Murakami........................ | 192/109 F |

*Primary Examiner*—Benjamin W. Wyche
*Attorney, Agent, or Firm*—Oblon, Fisher, Spivak, McClelland & Maier

[57]               ABSTRACT
Clutch controlling apparatus which may be utilized in industrial-type vehicles, such as for example, forklift trucks, for controlling the vehicle during inching operations includes a source of fluid pressure, a fluid pressure-type clutch fluidically connected to the pressure source, an inching valve disposed within the fluid circuit connecting the fluid pressure source and the clutch mechanism which controls the degree to which the clutch mechanism is actuated and which in turn is actuated to a degree which is dependent upon the depression of the vehicle brake pedal, and limitng means for selectively inactivating the inching valve such that the inching valve is inoperative independent of the brake pedal.

In this manner, when the vehicle is being operated on level ground, the inching operation is performed by intermittently depressing the brake pedal which actuates the inching valve which in turn deactivates the clutch mechanism thereby terminating driving torque to the vehicle transmission. When the vehicle is operated upon ground having a downward slope, the limiting means inactivates the inching valve whereupon depression of the brake pedal does not actuate the inching valve so as to deactuate the clutch mechanism. Consequently, the vehicle is not effectively placed in a neutral condition and the vehicle does not operate in an uncontrolled manner and the inching operation may be performed by the braking means.

The fluid pressure from the fluid pressure source is also exhausted directly from a drain port without passing through an orifice cylindrical section, so as to maintain a predetermined pressure when the brake is not actuated.

7 Claims, 2 Drawing Figures

INCHING AND PRESSURE REGULATING VALVES FOR CLUTCHES

CROSS-REFERENCES TO RELATED APPLICATIONS

This is a continuation-in-part application Ser. No. 335,144, filed Feb. 23, 1973.

BACKGROUND OF THE INVENTION

1. Field of the Invention

The present invention relates generally to control apparatus and more particularly to clutch controlling apparatus having a fluid pressure clutch control circuit for deactivating a clutch within a vehicle transmission which is interdependently associated with a brake pedal within a vehicle, especially an industrial vehicle having a power shift mechanism.

2. Description of the Prior Art

Heretofore, regulator valves used in clutch fluid pressure control circuits have been formed for the purpose of maintaining a predetermined pressure, but have not been considered to relate to an inching action. Accordingly, the inching valve of such circuits usually have two orifice cylindrical sections which are respectively, separated in the axial direction. One of the orifice cylindrical sections controls the fluid pressure from the fluid pressure source to the clutch and the other orifice cylindrical section controls the pressure exhausted to a drain port, both of the orifice cylindrical sections being related to each other so as to provide the fluid pressure, required for the inching function, to the clutch. In order to achieve such relativity however, there have been difficulties in the design of the circuit.

SUMMARY OF THE INVENTION

Accordingly, it is an object of the present invention to provide an improved clutch controlling apparatus having a clutch fluid pressure control circuit having associated therewith a specific regulator valve having the function of automatically interfering with the passage leading from the pressure source to the clutch, by actuation of an inching valve, so that the fluid pressure of the clutch side is less than the normal predetermined pressure of the regulator valve, whereby one of the orifice cylindrical sections of the inching valve may be deleted so as to neglect the relativity of both of the cylindrical sections in the design thereof.

Another object of the present inventio is to provide an improved clutch controlling apparatus having a regulator valve which has high regulator characteristics by forming an orifice cylindrical section which is inactive at the predetermined pressure so as to operate the same as with a normal regulator valve, but to interfere with the fluid passage, leading from the fluid pressure source to the clutch, within the regulator valve when the pressure is less than the predetermined pressure.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
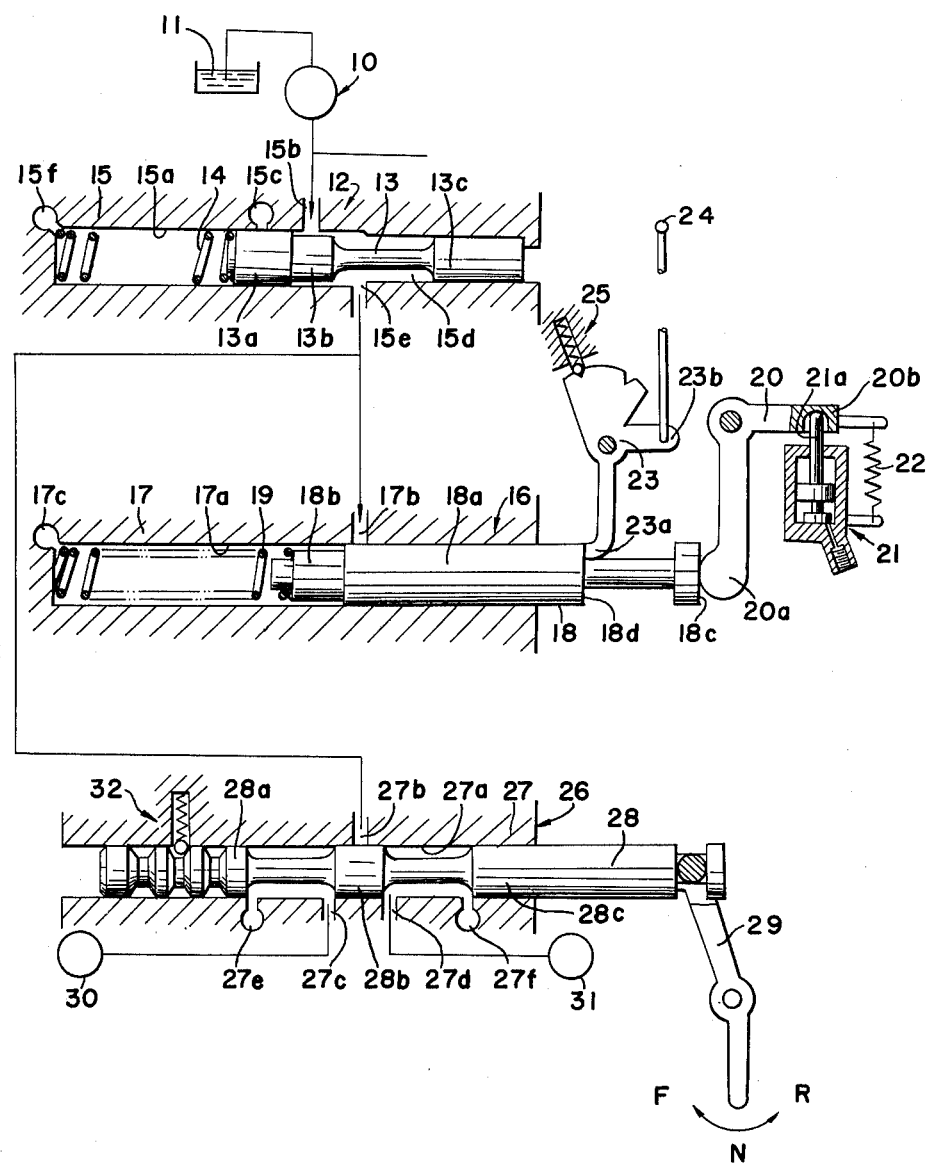
FIG. 1 is a schematic partially sectional view of one embodiment of a clutch controlling apparatus having a fluid pressure clutch control circuit, constructed according to the present invention.

Referring now to the drawings, a fluid pump 10 is actuated by an engine, not shown, so as to deliver oil from an oil reservoir tank 11 to a regulator valve, generally indicated by the reference character 12. The regulator valve 12 comprises a valve 13 and a coil spring 14 which biases the valve 13 toward the right as seen in the Figures, both the valve 13 and the spring 14 being disposed within an axial bore 15a formed within a valve body 15 of the regulator valve 12. The valve 13 of the embodiment shown in FIG. 1 includes a cylindrical section 13a whose diameter is slightly less than that of bore 15a, a cylindrical section 13b of a slightly smaller diameter which is integrally joined to the large diameter section 13a, and a cylindrical section 13c having a diameter which is also smaller than that of the section 13a and which is separated from the section 13b by means of an axial cylindrical section of still smaller diameter.

Figure 2:
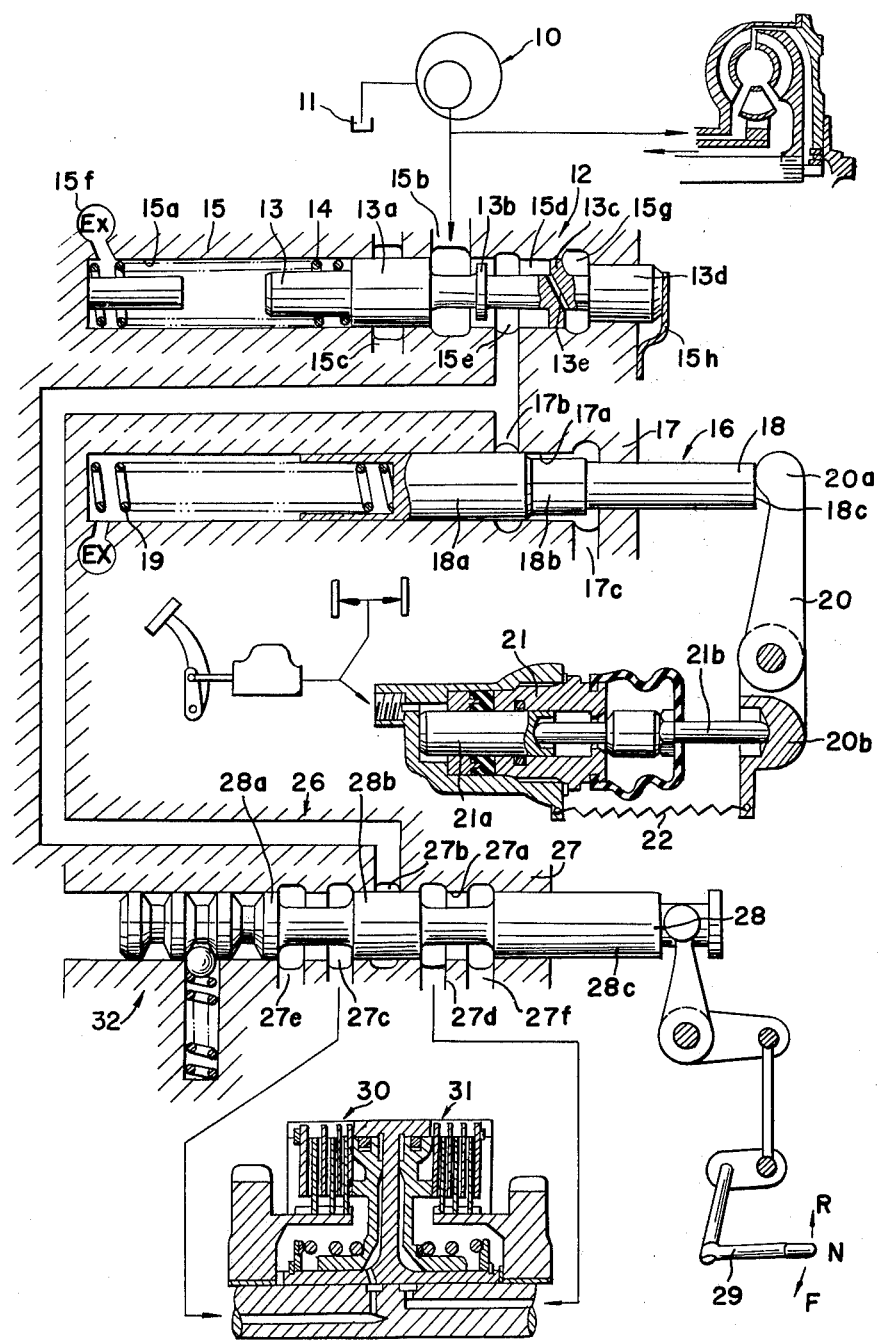
FIG. 2 is a schematic partially sectional view of another embodiment of a clutch controlling apparatus having a fluid pressure clutch control circuit constructed according to the present invention.

Within the embodiment shown in FIG. 2, the valve 13 includes a first large cylindrical section 13a, a second large cylindrical section 13c whose diameter is the same as that of cylindrical section 13a, and a cylindrical section 13d having a diameter which is smaller than that of section 13a. Still another disc-type section 13b is interposed between sections 13a and 13c and has a diameter similar to that of section 13d.

Within the valve body 15, radially extending ports 15b, 15c and 15e, as well as port 15f are formed so as to be fluidically connected with the valve bore 15a. The port 15b is connected to the output of the fluid pump 10 while the port 15e is connected to an inching valve, generally indicated by the reference character 16, and a manually operated valve, generally indicated by the reference character 26. The ports 15c and 15f are the discharge openings to the oil tank 11. The ports 15b is always connected to the port 15e through an annular fluid pressure chamber 15d defined between the cylindrical section 13a and the cylindrical section 13c of the valve 13.

Referring again to the embodiment of FIG. 2, a second fluid pressure chamber 15g is defined between the second large cylindrical section 13c and the small cylindrical section 13d, and is usually connected to the first fluid pressure chamber 15d by means of an orifice 13e formed within the second cylindrical section 13c. Although the orifice 13e is shown as being formed within the second cylindrical section 13c, the orifice 13e can alternatively be formed as a passage which usually connects the first fluid pressure chamber 15d and the second fluid pressure chamber 15g and is formed within the valve body 15, whereby the same operation and results can be attained. At the right side of the valve body 15, there is also provided a stopper 15h for maintaining the valve 13 in the position as shown in FIG. 2 when the regulator valve 12 does not serve to adjust to a predetermined pressure.

Within the embodiments of FIGS. 1 and 2, the inching valve 16 includes a valve 18 and a coil spring 19 which biases the valve 18 toward the right, as seen in the Figures, the valve 18 having a cylindrical section 18a which is slidably disposed, in sealing relationship, within a valve bore 17a formed within an inching valve body 17, and a cylindrical section 18b of a diameter smaller than that of section 18a, the sections 18a and 18b integrally joined together.

Within the inching valve body 17, there are formed ports 17b and 17c which are fluidically connected to the valve bore 17a, the port 17b always being connected to the port 15e of the regulator valve 12, and in the normal condition, the port 17b is closed by means of the large diameter section 18a of the valve 18. The port 17c is a discharge opening to the oil tank 11. As seen in FIG. 1, at the right end portion of the valve 18, there is provided a stem member having a first flange portion 18c which contacts one side of an arm 20a of an L-shaped lever 20 which is pivoted to the vehicle body, not shown. Another arm 20b of L-shaped lever 20 is contacted to an end portion of a piston 21a, disposed within a fluid pressure cylinder 21 mounted to the vehicle body, which is moved in the upward direction, as seen in the Figure, by means of a damping fluid pressure provided by the master cylinder in the brake system. Within the embodiment of FIG. 2, lever 20 is linearly configured, arm 20b being in contact with a piston rod 21b which is actuated to the right, a seen in the Figure, by means of the fluid pressure associated with the brake master cylinder.

A spring 22 is tensioned between an extended portion of arm 20b and an arm mounted to the fluid pressure cylinder 21 so as to actuate the lever 20, whereby contact between the arm 20a and the flange 18c is positively made and the port 17b is closed by means of the large diameter section 18a of the valve 18 which compresses the spring 19. The springs 22 are return springs for the pistons 21a and 21b which have the function of stoppers for preventing further rotation of the levers 20, under the influence of the springs 22, past the positions shown in the Figures.

within the embodiment of FIG. 1, a second flange portion 18d is formed upon the right edge surface of the large diameter section 18a, a first arm 23a, of a limiting means 23 which is pivoted to the vehicle body, contacting the second flange portion 18d. A manually operated rod and knob assembly 24, provided within the operator's cab, is connected to a second arm 23b of the limiting means 23 so as to pivotably rotate the limiting means. A detent means 25, mounted to the vehicle body, is also provided relative to another portion of the limiting means 23 for determining two positions of means 23 relative to valve 18, one position retaining the valve 18 at the position shown in FIG. 1 by means of assembly 24 acting upon arm 23b which in turn causes arm 23a to abut flange portion 18d as shown in the drawing, and another position which permits the release of the first arm 23a from abutting the second flange 18d by moving the assembly 24 in an upward direction as seen in FIG. 1 which rotates arms 23b and 23 a in a counter-clockwise direction.

Within both embodiments of FIGS. 1 and 2, the conventional manually operated valve 26 similarly includes an axial bore 27a formed within a valve body 27 having radial ports 27b, 27c, 27e and 27f fluidically connected to the bore, and a valve 28 which is slidably disposed, in sealing relationship, within the valve bore 27a. The valve 28 has cylindrical portions 28a, 28b, and 28c all of which have the same diametrical dimension. The port 27b is connected through an oil passage to the port 15e of the regulator valve 12 while the port 27c is connected to a servo mechanism of a clutch mechanism 30 for commencing a forward movement of the vehicle, not shown. Similarly, the port 27d is connected to a clutch mechanism 31 for commencing a backward movement of the vehicle, while the ports 27e and 27f are discharge openings to the oil tank 11. A shift lever 29 provided within the operator's cab is desirably connected to the right end of the valve 28, as seen in the Figures, a detent means, generally indicated by the reference character 32, for positioning the valve 28 at a neutral position, a forward movement position, or a backward movement position, being formed at the left end of the valve 28.

In operation of the embodiment of FIG. 1, the oil pressure supplied from the pump 10 to the regulator 12 is introduced into the chamber 15d so as to provide the hydraulic pressure to the differential area existing between the large cylindrical section 13a and the small cylindrical section 13c whereby the oil pressure within the chamber 15d is regulated so as to be substantially constant by means of controlling the opening and closing of the outlet 15c by moving the valve 13 toward the left against the biasing action of the spring 14.

In operation of the embodiment of FIG. 2, the oil pressure supplied from the pump 10 to the regulator valve 12 is introduced into the chambers 15d and 15g, through means of passage 13e, so as to provide the fluid pressure to the differential area existing between the second large cylindrical section 13c and the small cylindrical section 13d whereby the fluid pressure within the chamber 15d is regulated so as to be substantially constant by means of controlling the opening and closing of the outlet 15c by moving the valve 13 toward the left against the biasing action of the spring 14. When the outlet 15c is so controlled, the orifice cylindrical section 13b is disposed within the port 15b, and thereby affects the passage between the port 15b and the first fluid pressure chamber 15d as well as the passage between the outlet 15c and the port 15b.

Within both embodiments of FIGS. 1 and 2, the oil pressure thus regulated to a substantially constant pressure by means of the regulator valve 12, is then supplied from the port 15 e to the port 17b of the inching valve 16 and the port 27b of the manually operated valve 26. However, since the port 17b is closed by means of the large cylindrical section 18a, the oil pressure supplied to such port is not supplied to the valve bore 17a, the valve 18 being held in the position shown in the Figures by means of the spring 22 and the lever 20 due to the fact that the brake pedal has not been depressed and therefore a damping fluid pressure is not provided to the fluid pressure cylinder 21. Similarly, since the port 27b of the manually operated valve 26 is also closed by means of the cylindrical section 28b of the valve 28 when the valve 28 is in the neutral position, the oil pressure is not supplied to either of the clutch mechanisms for commencing a forward movement or a backward movement, and consequently, the transmission is not actuated so as to transmit driving power and the vehicle is therefore maintained in the stopped position.

When, however, the shift lever 29 is shifted to the F or forward position, the valve 28 is shifted toward the right as seen in the Figures whereby the port 27b is now fluidically connected to the port 27c by means of the annular chamber defined between the sections 28a and 28b, while the outlet 27e is closed by means of the cylindrical section 28a. Accordingly, the fluid pressure, hereinafter referred to as the line pressure, regulated by the regulator valve 12 is now supplied to the clutch 30 for commencing a forward movement whereby the vehicle is advanced.

When the shift lever 29 is set to the R or reverse position, the valve 28 is shifted toward the left whereby the port 27b is not connected to the port 27d and the outlet port 27f is closed by means of section 28c so as to transmit the line pressure to the clutch 31 for commencing a backward or reverse movement of the vehicle.

In addition, with respect to the embodiment of FIG. 1, if while the transmission is in the forward or backward position and the assembly 24 is also in its upper position, the brake pedal is depressed, the braking fluid pressure is transmitted to the fluid pressure cylinder 21 whereby the piston 21a is raised against the biasing force of the spring 22 and the L-shaped lever 20 is consequently rotated in a counterclockwise direction around the pivot point. The valve 18, under the biasing action of the spring 19 and due to the release therefrom of the L-shaped lever 20, is then shifted toward the right as seen in FIG. 1. The shift rate is dependent upon the damping fluid pressure corresponding to the degree of depression of the brake pedal and the balance between the tension of the spring 22 and the spring 19, and accordingly, the shift rate of the valve 18 can be selectively by the degree of depression of the brake pedal.

Similarly, with respect to the embodiment of FIG. 2, when fluid pressure is supplied to piston 21 by means of the brake pedal, piston rod 21b rotates lever 20 in a counterclockwise direction so as to have arm 20a abut valve 18 and move the same toward the left, as seen in Figure, against the biasing force of spring 19, thereby opening port 17b with bore 17a.

When the large cylindrical section 18a of the valve 18 is moved so as to fluidically connect the port 17b with the valve bore 17a, the fluid pressure within the chamber 15d of the regulator valve 12 may be supplied to the port 17b so as to be transmitted to the annular chamber surrounding section 18b and is then exhausted through the valve bore 17a and the outlet 17c so as to become low pressure. Accordingly, the valve 13 of the regulator valve 12 is returned by the force of spring 14 to the position shown in the Figures and an annular chamber is formed about the section 13b so as to fluidically connect port 15b and the chamber 15d. The fluid pressure within the chamber 15d, that is, the fluid pressure for actuating the clutch 30 for a forward movement or the clutch 31 for a backward movement, is thus regulated to a pressure which is lower than the pressure between the pump 10 and the regulator valve 12 due to the relation between the chamber about section 13b and the chamber about section 18b, whereby the force acting upon the clutch 30 or 31 is altered so that the transmission is moved from a semi-clutched condition to a declutched condition and the inching operation of the vehicle can be achieved only by operation of the brake pedal.

The inching operation can of course be achieved by depressing the brake pedal. However, even when the brake pedal is depressed for decreasing the speed of the vehicle, such as for example, when the vehicle is upon land having a downward slope, the inching valve 16 nevertheless imparts the inching operation to the vehicle such that, before the complete actuation of the brake, the vehicle, under the influence of gravity, may move in an uncontrolled fashion, whereby the vehicle may accidentally collide with an obstacle or person.

Accordingly, when the vehicle is upon land having a downward slope, the assembly 24 is moved so as to shift the limiting means 23 to the position shown in FIG. 1, whereby the first arm 23a of the limiting means abuts the second flange 18d of the valve 18 whereby the valve 18 is restrained in the position shown in FIG. 1. Hence, even when the brake pedal is depressed so as to shift the arm 20a of the L-shaped lever 20 toward the right as seen in FIG. 1, while the contact between the arm 20a and the first flange 18c of the valve 18 is broken, the valve 18 is nevertheless retained in its position as shown in FIG. 1, whereby the inching function of the inching valve 16 is inactivated. In this manner, when the brake pedal is depressed the line pressure is transmitted to the clutch 30 for forward movement or the clutch 31 for backward movement, whereby a driving torque is continuously transmitted to the transmission and the vehicle does not operate in an uncontrolled fashion.

In accordance with the embodiment of FIG. 1, when the fluid pressure of the clutch assembly is lower than a predetermined pressure of the regulator valve by means of the operation of the inching valve during braking, the orifice cylindrical section formed upon the regulator valve automatically operates to interfere with the passage of fluid from the pressure source of the clutch. Accordingly, it is possible to delete one of the orifice cylindrical sections which controls the fluid pressure from the fluid pressure source of the inching valve to the clutch, it therefore being unnecessary to consider the relativity, between the orifice cylindrical section and the other orifice cylindrical section controlling the pressure exhausting to the drain port, in the design of the apparatus whereby such design may be simplified. Moreover, it is possible to achieve a buffer function in lieu of a large accumulator volume, used for shock absorbtion, at the connection of the clutch by the depression action at the lower pressure.

In accordance with the embodiment of FIG. 2, when the regulator valve adjusts the line pressure, the orifice cylindrical section of the regulator valve is inactuated by providing no interference at the outlet side which seriously affects the adjustment of the regulator valve, so as to accurately adjust it. However, when the fluid pressure of the clutch side becomes lower than a predetermined pressure of the regulator valve, as a result of the action of the inching valve during braking, the passage from the pressure source to the clutch is automatically interfered with whereby one of the orifice cylindrical sections used for controlling the fluid pressure from the pressure source of the inching valve to the clutch can be deleted. Accordingly, the design of the apparatus can be simplified as in the case of the embodiment of FIG. 1.

Obviously many modifications and variations of the present invention are possible in light of the above teachings. It is to be understood therefore that with the scope of the appended claims this invention may be practiced otherwise than as specifically described herein.

What is claimed as new and desired to be secured by Letters Patent of the United States is:

1. A clutch fluid pressure control circuit which comprises:
   a fluid pressure source;

a fluid pressure type actuated by means of said fluid pressure source;
a passage fluidically connecting said fluid pressure source to said clutch;
an inching valve which is connected to said passage and which controls the pressure transmitted to said clutch which is dependent upon the degree of depression of a brake pedal; and
regulator valve means comprising orifice means formed within said passage and being operable for decreasing the fluid pressure, within said passage, from said pressure source to said clutch when the fluid pressure to said clutch is decreased as a result of the inching action during braking and for maintaining a predetermined pressure by providing no interference of said orifice means for exhausting the fluid pressure from aid fluid pressure source during the time said brake pedal is not depressed;
said inching valve including a body portion, a valve member slidably disposed within said body portion, a single port defined within said body portion for fluidically connecting said inching valve to said regulator valve, and an exhaust port defined within said body portion for fluidically connecting said inching valve to a reservoir, said valve member including a single large diameter cylindrical section and a single small diameter cylindrical section integrally connected to said large section for permitting fluid communication between said single port and said exhaust port, said single port connecting said inching valve to said regulator valve being closed or blocked by said large diameter section when said brake pedal is not depressed whereby fluid communication between said single port and said exhaust port is interrupted and being opened when said pedal is depressed whereby fluid communication between said single port and said exhaust port is established,
said regulator valve including an inlet means connecting to said fluid pressure source and an outlet means connecting to said clutch, and further including a first large cylindrical section for controlling the fluid pressure from said pressure source to a reservoir and a second cylindrical section which regulates the fluid connection between said inlet means and said outlet means, said second section having a diameter less than that of said first section and said second section being operatively connected with said first section,
whereby the fluid connection between said inlet means and said outlet means is restricted by said second section when the pressure of said outlet means is low.

2. The clutch fluid pressure control circuit as set forth in claim 1, wherein said regulator valve further comprises:
a valve body;
a valve bore formed within said valve body;
said inlet means, said outlet means and a passage to said reservoir being formed within said valve body and communicating with said valve bore at spaced longitudinal points thereof;
a valve including said first and said second cylindrical sections being slidably inserted within said valve bore; and
a spring which continuously actuates said valve in a direction which interferes with the passage of fluid through said valve.

3. The clutch fluid pressure control circuit as set forth in claim 2, wherein said regulator valve further comprises a third cylindrical section having a diameter smaller than that of said first large cylindrical section and being spaced from said second cylindrical section.

4. The clutch fluid pressure control circuit as set forth in claim 3, wherein said second cylindrical section is immediately adjacent to said first large cylindrical section.

5. The clutch fluid pressure control circuit as set forth in claim 3, wherein said second cylindrical section is spaced from said first large cylindrical section.

6. A clutch fluid pressure control circuit as set forth in claim 1, wherein said inching valve further comprises a spring which continuously actuates said valve member in a direction which permits fluid communication between said single port and said exhaust port.

7. A clutch fluid pressure control circuit as set forth in claim 1, wherein said inching valve further comprises a spring which continuously actuates said valve member in a direction which blocks fluid communication between said single port and said exhaust port with said large diameter section of valve member.

* * * * *